US011556810B2

(12) United States Patent
Perera et al.

(10) Patent No.: US 11,556,810 B2
(45) Date of Patent: Jan. 17, 2023

(54) ESTIMATING FEASIBILITY AND EFFORT FOR A MACHINE LEARNING SOLUTION

(71) Applicant: INTERNATIONAL BUSINESS MACHINES CORPORATION, Armonk, NY (US)

(72) Inventors: Pathirage Dinindu Sujan Udayanga Perera, San Jose, CA (US); Orna Raz, Haifa (IL); Ramani Routray, San Jose, CA (US); Eitan Daniel Farchi, Pardes Hana (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 501 days.

(21) Appl. No.: 16/508,698

(22) Filed: Jul. 11, 2019

(65) Prior Publication Data
US 2021/0012221 A1    Jan. 14, 2021

(51) Int. Cl.
| | |
|---|---|
| G06N 5/04 | (2006.01) |
| G06N 20/00 | (2019.01) |
| G06N 5/02 | (2006.01) |
| G06K 9/62 | (2022.01) |

(52) U.S. Cl.
CPC ............ G06N 5/04 (2013.01); G06K 9/6267 (2013.01); G06N 5/025 (2013.01); G06N 20/00 (2019.01)

(58) Field of Classification Search
CPC .......... G06N 5/04; G06N 20/00; G06N 5/025; G06K 9/6267; G06K 9/6262
See application file for complete search history.

(56) References Cited

U.S. PATENT DOCUMENTS

| | | |
|---|---|---|
| 7,792,353 B2 | 9/2010 | Forman et al. |
| 8,452,718 B2 | 5/2013 | Jin et al. |
| 9,275,347 B1 | 3/2016 | Harada et al. |

(Continued)

OTHER PUBLICATIONS

Francisco Gallego-Durán, Rafael Molina-Carmona, and Faraón Llorens-Largo. 2018. Estimating the difficulty of a learning activity from the training cost for a machine learning algorithm. In Proceedings of the Sixth International Conference on Technological Ecosystems for Enhancing Multiculturality (Year: 2018).*

(Continued)

*Primary Examiner* — Ann J Lo
*Assistant Examiner* — Fen Christopher Tamulonis
(74) *Attorney, Agent, or Firm* — Andre Adkins (57) ABSTRACT

A method, computer system, and a computer program product for assessing a likelihood of success associated with developing at least one machine learning (ML) solution is provided. The present invention may include generating a set of questions based on a set of raw training data. The present invention may also include computing a feasibility score based on an answer corresponding with each question from the generated set of questions. The present invention may then include, in response to determining that the computed feasibility score satisfies a threshold, computing a level of effort associated with developing the at least one ML solution to address a problem. The present invention may further include presenting, to a user, a plurality of results associated with assessing the likelihood of success of the at least one ML solution.

17 Claims, 5 Drawing Sheets

(56) References Cited

U.S. PATENT DOCUMENTS

| | | | |
|---|---|---|---|
| 9,916,540 B2 | 3/2018 | Shoaib et al. | |
| 10,699,215 B2* | 6/2020 | Devarakonda | G06N 5/022 |
| 2014/0189829 A1* | 7/2014 | McLachlan | H04L 63/08 |
| | | | 726/6 |
| 2015/0019460 A1* | 1/2015 | Simard | G06F 3/0482 |
| | | | 706/11 |
| 2015/0120621 A1* | 4/2015 | Alkov | G06F 16/335 |
| | | | 706/46 |
| 2015/0356420 A1* | 12/2015 | Byron | G06N 7/00 |
| | | | 706/12 |
| 2018/0082211 A1 | 3/2018 | Allen et al. | |
| 2018/0240010 A1 | 8/2018 | Faivishevsky et al. | |
| 2021/0287048 A1* | 9/2021 | Walters | G06N 20/00 |

OTHER PUBLICATIONS

F. Gallego-Durán, R. Molina-Carmona and F. Llorens-Largo. 2018. Estimating the difficulty of a learning activity from the training cost for a machine learning algorithm. In Proceedings of the 6th International (Year: 2018).*

Yunjia Sun, Edward Lank, and Michael Terry. 2017. Label-and-Learn: Visualizing the Likelihood of Machine Learning Classifier's Success During Data Labeling.(IUI '17). Association for Computing Machinery, New York, NY, USA, 523-534. https://doi.org/10.1145/3025171.3025208 (Year: 2017).*

T. Idé and A. Dhurandhar, "Informative Prediction Based on Ordinal Questionnaire Data," 2015 IEEE International Conference on Data Mining, 2015, pp. 191-200, doi: 10.1109/ICDM.2015.150. (Year: 2015).*

Luo G, Stone BL, Johnson MD, Tarczy-Hornoch P, Wilcox AB, Mooney SD, Sheng X, Haug PJ, Nkoy FL. Automating Construction of Machine Learning Models With Clinical Big Data: Proposal Rationale and Methods. JMIR Res Protoc. Aug. 29, 2017;6(8):e175. doi: 10.2196/resprot.7757. (Year: 2017).*

Srdjana Dragicevic, Stipe Celar, Mili Turic, Bayesian network model for task effort estimation in agile software development; JSS vol. 127 pp. 109-119 https://doi.org/10.1016/j.jss.2017.01.027. (Year: 2017).*

Josua Krause, Adam Perer, and Kenney Ng. 2016. Interacting with Predictions: Visual Inspection of Black-box Machine Learning Models.(CHI '16). Association for Computing Machinery, New York, NY, USA, 5686-5697. https://doi.org/10.1145/2858036.2858529 (Year: 2016).*

Misra, Ishan et al. "Learning by Asking Questions" CVPR 2018 [Published 2018] [Retrieved Oct. 2022] <URL: https://openaccess.thecvf.com/content_cvpr_2018/papers/Misra_Learning_by_Asking_CVPR_2018_paper.pdf> (Year: 2018).*

Mell et al., "The NIST Definition of Cloud Computing", Recommendations of the National Institute of Standards and Technology, NIST Special Publication 800-145, Sep. 2011, 7 pages.

Herbold, "Training data selection for cross-project defect prediction", Promise'13, Oct. 9, 2013, 10 pages.

Swan et al., "How Good is Good Enough? Quantifying the Effects of Training Set Quality", GeoAI'18, Nov. 6, 2018, 5 pages.

* cited by examiner

ESTIMATING FEASIBILITY AND EFFORT FOR A MACHINE LEARNING SOLUTION

BACKGROUND

The present invention relates generally to the field of computing, and more particularly to the development of machine learning (ML).

The success of an artificial intelligence (AI) project may depend on multiple conditions, such as the availability of labeled training data, labeling techniques, and light domain knowledge.

SUMMARY

Embodiments of the present invention disclose a method, computer system, and a computer program product for assessing a likelihood of success associated with developing at least one machine learning (ML) solution. The present invention may include generating a set of questions based on a set of raw training data. The present invention may also include computing a feasibility score based on an answer corresponding with each question from the generated set of questions. The present invention may then include, in response to determining that the computed feasibility score satisfies a threshold, computing a level of effort associated with developing the at least one ML solution to address a problem. The present invention may further include presenting, to a user, a plurality of results associated with assessing the likelihood of success of the at least one ML solution.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for developing at least one machine learning (ML) solution. As such, the present embodiment has the capacity to improve the technical field of ML solutions by estimating a feasibility score and a level of effort involved in the development of the ML solution. More specifically, the success assessment program may receive a set of raw training data. Next, the success assessment program may generate a series of questions with corresponding answers to the series of questions, and then compute a feasibility score, which is compared with a threshold. If the feasibility score satisfies the threshold, then the level of effort is compared and the results are presented to a user.

As previously described, the success of an artificial intelligence (AI) project may depend on multiple conditions, such as the availability of labeled training data, labeling techniques, and light domain knowledge.

Minimal, if any, experience may exist in developing successful ML solutions when any of these conditions break or fail to exist. These conditions, however, often break in the domain of business applications. For example, in the business solutions domain, only a few labeled data are available, labeling is impractical or a subject matter expert (SME) is unavailable to perform labeling, and the training and modeling will include a high level of domain knowledge. Therefore, there is lesser likelihood of success associated with developing successful ML solutions, especially for the above stated business solutions domain.

Additionally, when developing ML solutions, an increased or high volume of human effort may cause minimal, if any, results thereby reducing the likelihood of success. As such, an effective way to increase the likelihood of success is to provide a means for early assessment of the feasibility of the solution, as well as an early assessment on the level of effort that a feasible solution will likely involve.

Therefore, it may be advantageous to, among other things, develop a likelihood of success reduction method for assessing the likelihood of success associated with developing at least one successful ML solution by estimating a feasibility score and level of effort under challenging business domain conditions, such as when only a few labeled data are available, labeling may be less practical (e.g., limited SME availability to perform the labeling), and training and modeling involves domain knowledge.

According to at least one embodiment, the success assessment program may bootstrap the learning process from a set of rules, as well as enhance the learning based on the subject matter expert (SME) defined rules. In the present embodiment, the success assessment program may execute ML algorithms from a pool of shared experience. The set of data may be collected from multiple projects, and a potential new ML solution may be classified as feasible or infeasible, and then, the potential new ML solution may be compared to an effort range based on similarity or distance from the past solution categories or classes.

According to at least one embodiment, the success assessment program may determine the feasibility for a particular ML solution. By determining the feasibility, the success assessment program may assign a numeric score for each answer to questions generated by the success assessment program (e.g., "yes" is assigned a numeric score of 1 and "no" is assigned a numeric score of 0). The sum of the assigned numeric score associated with each answer to the generated questions may be utilized to compute a feasibility score. In another embodiment, the success assessment program may change the numeric score for a question and add more values and/or provide more sophisticated functions for computing the feasibility score (e.g., weighted sum).

According to at least one embodiment, the success assessment program may estimate a level of effort. If the answer to a generated question is "Yes" or affirmative, then the success assessment program may provide finer grain options for the questions assessing the effort needed (e.g., low, moderate or high). Then, the success assessment program may apply a function (e.g., weighted sum) to determine the level of effort.

According to at least one embodiment, the success assessment program may include specific design elements, namely including a defined system business value metric, the ability to obtain an unutilized test set associated with the ML solution, representation of real life data in the raw training data, approximately 30 examples of pre-labels, statistically estimated labeling accuracy, the possibility of ongoing labeling, and ten times more data than features (if a generalization model is to be obtained).

According to at least one embodiment, the success assessment program may include model developments, namely automating the relearning from raw training data (e.g., the entire data pipeline may be automated). For an object, a mapping that obtains the characteristics for each stage of the data pipeline may exist, and a complete list of hyper parameters may be available (e.g., for each hyper parameter, if the optimal value was searched for automatically as part of the automatic data pipeline, each hyper parameter that is not searched for decreases in likelihood of success). The present embodiment may include a model developed using advanced statistical techniques that estimate performance (at least k-fold cross validation). Additionally, one or more non-parametric confidence intervals may be developed for all averages, and statistical assumptions may be made during the data pipeline development that are explicit and an appropriate check may be implemented at the deployment time. For example, two features may be correlated and one of them is dropped. At deployment time, the success assessment program may check whether the two features are still correlated.

According to at least one embodiment, the success assessment program may include testing and deployment. The testing may be performed on one or more sets of ground truth, which may never be utilized for learning using advanced statistical techniques, such as boot strapping and non-parametric confidence intervals. The one or more sets of ground truth may be sliced to identify weakness (e.g., asset under development), and statistical assumptions may be developed at the development stage.

Figure 1:
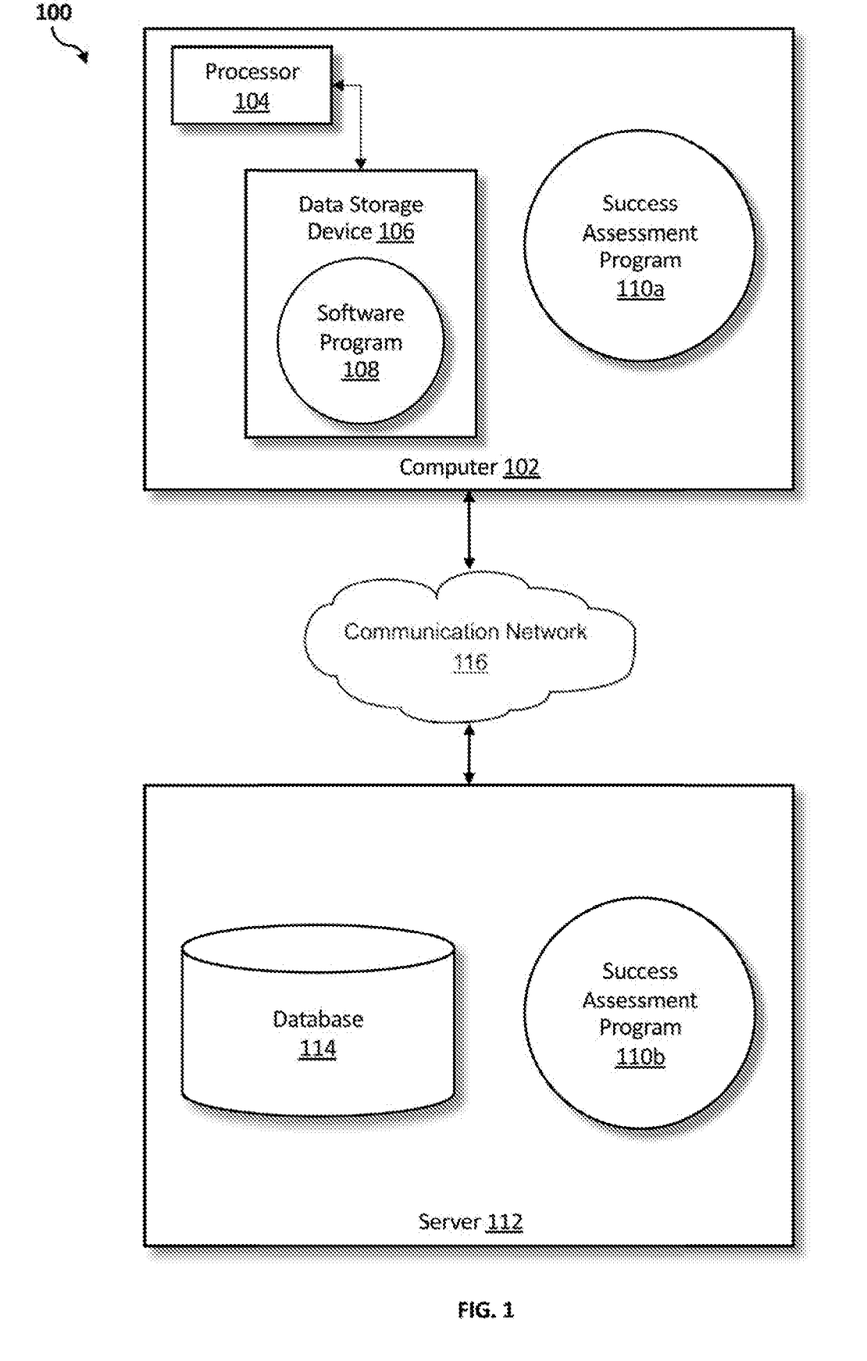
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a success assessment program 110a. The networked computer environment 100 may also include a server 112 that is enabled to run a success assessment program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the success assessment program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the success assessment program 110a, 110b (respectively) to develop at least one ML solution by estimating a feasibility score and a level of effort. The success assessment method is explained in more detail below with respect to FIG. 2.

Figure 2:
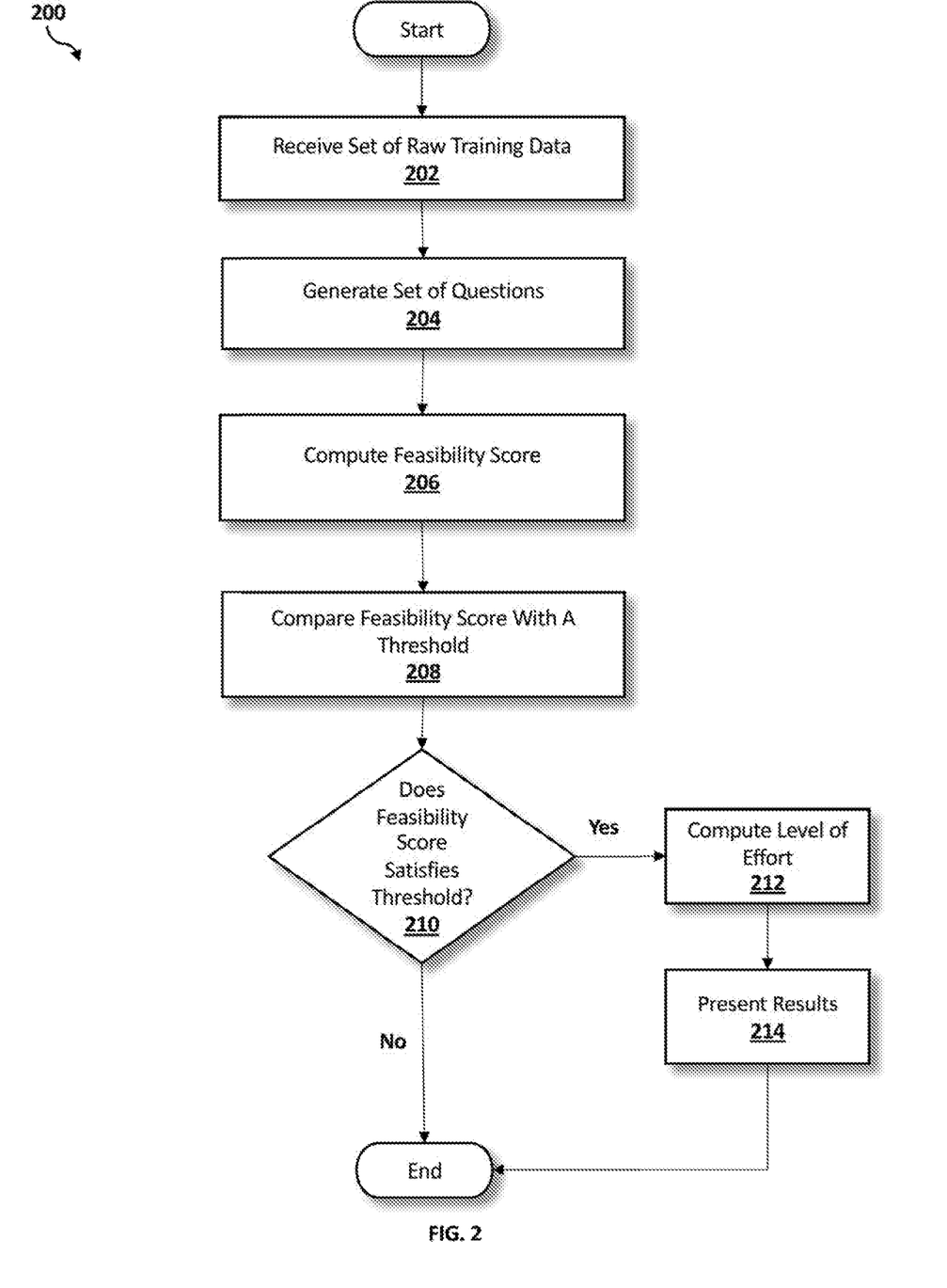
FIG. 2 is an operational flowchart illustrating a process for assessing a likelihood of success associated with developing at least one machine learning (ML) solution according to at least one embodiment.

Referring now to FIG. 2, an operational flowchart illustrating the exemplary machine learning (ML) solution development process 200 used by the success assessment program 110a, 110b according to at least one embodiment is depicted.

At 202, a set of raw training data is received. Utilizing the software program 108 on the user's device (e.g., user's computer 102), at least one set of raw training data may be automatically received as input into the success assessment program 110a, 110b via the communication network 116. The set of raw training data may include real life data associated with reports, documents, execution logs and/or source code, and other media for storing and/or transferring data associated with a particular task (e.g., health records and/or medical trials for identifying adverse events, x-rays for determining whether an inspection and/or review of a mammograph should be performed by a human radiologist and/or human expert, software test execution logs for determining whether a test failure is the result of a problem in the execution environment or a problem in the underlying software-under-test). In at least one embodiment, a user may manually upload the set of raw training data into the success assessment program 110a, 110b.

For example, a clinical trial with 600 patients is being conducted on a new medication for hypertension. One of the research scientists for the clinical trial recommends a machine learning (ML) solution to identify adverse events (or side effects) to the new drug based on the raw training data, namely medical reports associated with each of the patients in the clinical trial. The research scientist further decides to utilize the success assessment program 110a, 110b to assess the likelihood of success associated with the ML solution for identifying the adverse events.

Next, at 204, a set of questions is generated. The questions may capture the best practices and identify shortfalls in the received set of raw training data. In at least one embodiment, the questions may be manually defined, and, in some other embodiments, the questions may possibly be automatically extracted. The success assessment program 110a, 110b may train a machine learning (ML) model that obtains input data associated with successful and unsuccessful ML models. Then, the questions may be aggregated by the phase of developing a particular ML model that applies to the received set of raw training data.

In at least one embodiment, the success assessment program 110a, 110b may include testing and deployment. The testing may be performed on one or more sets of ground truth, which may be utilized for learning using advanced statistical techniques, such as boot strapping and non-parametric confidence intervals. The one or more sets of ground truth may be sliced to identify weakness (e.g., asset under development), and statistical assumptions may be developed at the development stage.

In at least one embodiment, the questions may be generated by an extractor. By utilizing natural language processing techniques (e.g., classification, sentiment, entity extraction, topic modeling), the extractor may parse the received set of raw training data to identify and extract any best practices or shortfalls in the received set of raw training data, which are used to generate questions for a user.

In the present embodiment, the success assessment program 110a, 110b may generate a minimum of at least one question. However, there may be a maximum limit of generated questions (e.g., the default maximum limit of generated questions is 20). In some embodiments, the success assessment program 110a, 110b may have no maximum limit for the number of generated questions. For example, the success assessment program 110a, 110b may generate as many questions as appropriate based on the identified shortfalls and best practices associated with the received set of raw training data.

Additionally, the success assessment program 110a, 110b may present the generated questions to the user. For example, the success assessment program 110a, 110b may present the generated questions via a dialog box or a chatbot screen. The user may be prompted to answer each of the generated questions with an affirmative response (e.g., by texting "Yes" in the command box located beneath each of the questions, by clicking a green or checkmark button under each of the questions), or a negative response (e.g., by texting "No" in the command box located beneath each of the questions, by clicking a red or a "X" mark button after each of the questions). In at least one embodiment, the success assessment program 110a, 110b may present the questions individually. Once the answer to one question is presented and answered by the user, the success assessment program 110a, 110b may then generate another question for the user to respond to.

In some embodiments, the success assessment program 110a, 110b may present, at once, a list of generated questions to the user. Underneath each of the questions, the success assessment program 110a, 110b may include space (e.g., a command box, or a button for an affirmative response and a button for a negative response) for the user to provide an answer to each of the generated questions.

In at least one embodiment, after the last generated question is answered by the user, the success assessment program 110a, 110b may present a message (e.g., "Questions successfully answered", "Thank you for your answers") to the user confirming the receipt of the answers.

In at least one embodiment, the generated questions and corresponding answers may be saved and stored in a database 114.

In another embodiment, the success assessment program 110a, 110b may include a "Don't Know" value or button (e.g., indicated by a question mark on the button or the phrase "Don't Know" on the button) as an answer to the generated questions.

In at least one embodiment, the user may identify hyperparameters and automatic search for the desired value (i.e., feasibility score), and the user may apply confidence intervals over ML performance measures, which may be reflected in the generated questions.

Continuing the previous example, the medical professionals associated with the clinical trial, namely, the team of research scientists, doctors, nurses, dietitians, social workers and psychiatrists, previously provided a list of fifteen questions for each of the patients to answer. The success assessment program 110a, 110b then prompts each of the patients with each of the fifteen previously provided questions, and each of the patients is further prompted to provide a "No" or "Yes" answer to each of the questions. The success assessment program 110a, 110b than saves the questions and corresponding answers associated with each of the patients in the database 114. Once a patient completes the fifteen questions, the success assessment program 110a, 110b is presented with a command, "Thank you for your responses" indicating that the patient successfully responded to the questions.

Then, at 206, a feasibility score is computed. The success assessment program 110a, 110b may generate a feasibility score based on the answers to the generated questions in which the feasibility score determines whether the data generated by the answers to the generated questions is sufficient or practical to develop a ML solution. The answers may be in binary form (e.g., "Yes" or "No"). Each answer to the generated question may be assigned a numeric value (e.g., "Yes" assigned a value of 1, "No" assigned a value of 0). The assigned numeric values may then be added together, and the sum of assigned values may be the feasibility score.

In at least one embodiment, the user of the success assessment program 110a, 110b may be the person developing the ML models.

In at least one embodiment, the success assessment program 110a, 110b may have a third answer option of "Don't Know" (i.e., may include one or more variations of "Don't Know," such as "Unsure," "Uncertain"). A "Don't Know" answer may be counted as a "−1" or similar value to indicate that further thought or analysis may be beneficial before moving ahead with the particular ML solution.

In another embodiment, the success assessment program 110a, 110b may change the score per question in which the answer to certain questions may yield greater weight than other answers. As such, the success assessment program 110a, 110b may compute the feasibility score by utilizing a weighted sum.

In one embodiment, when more than one feasibility score is computed, the success assessment program 110a, 110b may sort the feasibility scores in a previously determined order (e.g., high to low, low to high). In some embodiments, the success assessment program 110a, 110b may utilize other data associated with the user and/or subject of the set of raw training data which the feasibility score is associated with to sort the feasibility scores. For example, if the ML solution includes addressing a problem based on different age groups, the feasibility scores may be sorted in increasing or decreasing age of the person associated with the set of raw training data utilized to compute the feasibility score.

In one embodiment, an adverse event classifier may be utilized to identify adverse events that occur in the set of raw training data received by the success assessment program 110a, 110b. By identifying the one or more adverse events, the adverse event classifier may transmit, via the communication network 116, the one or more adverse events to the success assessment program 110a, 110b to compute the feasibility score.

Continuing the previous example, for each adverse event, such as hallucinations, dizziness and numbness in legs and arms, which occurs in the 600 patients in the clinical trial, a feasibility score is computed. Each "Yes" response is assigned a "1" and each "No" response is assigned a "0". Therefore, the highest feasibility score that an adverse event can obtain is a "15". The success assessment program 110a, 110b computes the feasibility score for each of the adverse events which ranges from 1 to 15. The success assessment program 110a, 110b further identifies data associated with each person in the set of raw training data, such as age of each person, gender, medical history and diseases, typical diet, and nationality.

Then, at 208, the feasibility score is compared with a threshold. The success assessment program 110a, 110b may compare the feasibility score with a threshold level (e.g., a default level is 75% out of 100%, 0.75 out of 1, 7.5 out of 10, 75 out of 100, or some normalized value of similar value), which was previously determined.

In at least one embodiment, the threshold may be previously determined by a human (e.g., an administrator or the user) in which the human may configure a threshold level. For example, the user may click on the "Settings" button located at the bottom right hand corner of the main screen. The user may then be prompted by a first dialog box with a list of different setting topics or options. When the user clicks the "Threshold" button, the first dialog box may disappear and a second dialog box will appear. The second dialog box includes a list of previously selected thresholds, and a text box at the bottom of the second dialog box for the user to include a new threshold level. Each of the previously selected threshold levels include a button on the left side of the previously selected threshold in which the user may click to select a previously selected threshold level. Once the threshold selection is completed, the user may click the "Submit" button located underneath the text box at the bottom of the second dialog box. The second dialog box will then disappear, and the new threshold level will be immediately implemented.

In some embodiments, the threshold level may be automatically determined by the success assessment program 110a, 110b based on the learning approach. The success assessment program 110a, 110b may utilize various threshold setting techniques (e.g., comparing data and proportional rates with similar periods in the past by using historical data, doubling or tripling of the absolute number of cases over a given time period, crossing a predefined threshold, modeling historical data by time series analysis techniques that may account for trends and seasonality in the data, notification of any recent changes that may affect the data). The threshold setting techniques may identify the most appropriate threshold for the specific task based on the data that the success assessment program 110a, 110b may implement.

Continuing the previous example, the team of research scientists previously selected "11" as the threshold level for the feasibility score for the clinical trial. Of the 800 adverse events experienced by the patients, only 150 adverse events satisfied (or had a feasibility score above 11) the threshold level.

Then, at 210, the success assessment program 110a, 110b determines whether the feasibility score satisfies the threshold. The success assessment program 110a, 110b may then evaluate the feasibility score to determine whether the feasibility score is lower than, equal to, or greater than the previously determined threshold. Based on whether the feasibility score satisfies the threshold, the success assessment program 110a, 110b may utilize a classifier to identify the ML solution as successful (e.g., feasibility score satisfies the threshold) or unsuccessful (e.g., feasibility score does not satisfy the threshold).

In at least one embodiment, the success assessment program 110a, 110b may present whether the feasibility score satisfies the threshold to the user by utilizing a visualization. For example, the success assessment program 110a, 110b presents whether the feasibility score satisfies the threshold with an indicator or gauge indicator that immediately shows whether the feasibility score is below, equal to, or above the threshold. In another embodiment, the success assessment program 110a, 110b may incorporate color coding (e.g., red or green), and/or up and down arrows to indicate whether the feasibility score satisfies the threshold.

In some embodiments, the success assessment program 110a, 110b may utilize a graph and/or chart (e.g., bar graph, pie chart, line graph, column chart, pivot table, area chart, scatter graph and/or bubble graph) to display the feasibility score.

In at least one embodiment, the user may previously determine whether the feasibility score visualization may be presented to the user after the feasibility score is compared to the threshold, or at later time by the success assessment program 110a, 110b. In the present embodiment, the success assessment program 110a, 110b may determine how the feasibility score is presented based on which of the visualizations may be previously selected by the user. In some embodiments, the success assessment program 110a, 110b may automatically determine how to present whether the feasibility score satisfies the threshold based on various factors (e.g., the number of feasibility scores and the number of thresholds, the difference between the feasibility score and threshold, user preferences). User preferences may include previous selections by the user based on the factors associated with the feasibility score and threshold.

In at least one embodiment, the success assessment program 110a, 110b may utilize a ML model to learn how to visualize whether the feasibility score satisfies the threshold based on past training data, factors associated with the feasibility score and threshold, and whether the user modified and/or changed the visualization for any preceding and successive feasibility score and threshold.

In at least one embodiment, the success assessment program 110a, 110b may identify the likelihood of success in developing a ML model based on the data associated with each person or event associated with the set of raw training data received. The success assessment program 110a, 110b may further generate a graph and/or chart that visualizes the different likelihood of success posed when developing a ML solution for different groups based on age, gender, nationality, typical diets and medical history and diseases. For example, the likelihood of success would be high for developing the solution for teenagers, but low for senior citizens, if most of the data is for teenagers and there is insufficient data for senior citizens.

Continuing the previous example, each of the 150 adverse events that satisfies the threshold level receives a green gauge indicator that shows that the computed feasibility score is above the threshold level. However, for each of the 650 adverse events that fail to satisfy the threshold level (or has a feasibility score that is equal to or less than 11), the user developing the ML model receives a red gauge indicator that shows that the computed feasibility score is equal to or below the threshold level.

If the success assessment program 110a, 110b determines that the feasibility score fails (or does not satisfy) to satisfy the threshold at 210, then the success assessment program 110a, 110b is concluded. In at least one embodiment, the success assessment program 110a, 110b may notify (e.g., via a dialog box) the user that the feasibility score fails to satisfy the previously determined threshold level. The success assessment program 110a, 110b may further identify a recommendation (e.g., the user may search for more additional sets of raw training data, redefine the learning goal, or further examine the generated questions for which the user provided a "No" and/or "Don't Know" answer). The recommendation may analyze multiple factors (e.g., answers, learning goals, sets of raw training data) that may affect the feasibility score and therefore the successfulness of the ML solution with addressing the associated problem. Each of the recommendations may include, for example, a hyperlink. If the user clicks the hyperlink corresponding with a recommendation, then the success assessment program 110a, 110b may expand the dialog box to include more details pertaining to the selected hyperlink.

In at least one embodiment, a learning goal may be changed or redefined based on the inclusion of less categories. For example, when imaging a task of classifying illness severity, where there may be 10 severity classes, the learning goal may be changed to classify the task into two classes instead, such as illness-of-any-severity, or no-illness.

For example, if the user clicks the hyperlink corresponding with searching for more additional sets of raw training data, then the success assessment program 110a, 110b may provide additional sources in which the user may obtain additional sets of raw training data. If the user clicks the hyperlink corresponding with redefining the learning goal, then the success assessment program 110a, 110b may provide a list of recommended learning goals for the user to review and select. If the user clicks the hyperlink corresponding with examining the answers to the generated questions, then the success assessment program 110a, 110b may provide a list of questions to which the user answered "No" and/or "Don't Know".

Continuing the previous example, the success assessment program 110a, 110b examines the questions with the corresponding "No" answers for each of the 650 adverse events with a feasibility score that fails to satisfy the threshold level. The success assessment program 110a, 110b further implores a secondary extractor to utilize NLP techniques to parse through the medical reports associated with the patients with these 650 adverse events to identify any data included in the medical reports that may explain the low feasibility score.

If, however, the success assessment program 110a, 110b determines that the feasibility score satisfies the threshold at 210, then the level of effort is computed at 212. The level of effort may be based on the estimated human time, the level of domain expertise, and/or the level of software engineering expertise to code the rules for the ML model based on the analysis of the set of raw training data. The user may then determine whether the level of effort is high, moderate or low depending on the estimated human time. In at least one embodiment, the baseline for estimating the human time and/or levels of domain and software engineering expertise may be determined by a subject matter expert (SME) to code a few rules and measure that and then extrapolate.

In at least one embodiment, the level of effort may be based on the number of computing tasks and/or resources performed to develop a successful ML solution, or to increase the likelihood of success in developing a ML solution.

In at least one embodiment, the level of effort may be automatically determined based on the importance of developing the ML model, and/or the average time for coding ML model in that domain and/or subject matter. The success assessment program 110a, 110b may then determine whether the level of effort is high, moderate or low.

In one embodiment, the level of effort may be estimated based on the effort invested in similar ML solutions by utilizing the learning approach (i.e., data about previous ML solutions may be utilized to determine the effort to be invested, in addition to other features, for the current ML solution). The level of effort for developing a ML model may also be based on the number of "No" and/or "Don't Know" answers to the generated questions.

In some embodiments, the level of effort for developing the rule-based parts may be given separately, based on the learning approach or the human/subject matter experts (SMEs) data labeling and validation. As such, the level of effort may be based on developing the rule-based parts for decomposing or classifying the problem to determine whether the ML solution may work, or the ML solution may not work, based on the answers to the questions for which SMEs and/or humans may be utilized to provide rules.

In another embodiment, the success assessment program 110a, 110b may utilize the minimum viable product (MVP) approach to estimate the level of effort for the different dimensions. The MVP approach may guide the user in providing answers to the generated questions. For example, the user may obtain and label the first set of raw training data, and then compare the set of raw training data with a second set of raw training data received by another human, or automatically obtained, to estimate the labeling accuracy expected for the first set of raw training data.

In another embodiment, the success assessment program 110a, 110b may utilize a learning approach in which the dimensions may be treated as meta features and a classifier may be trained to determine whether the ML solution may be successful or unsuccessful. In some embodiments, the success assessment program 110a, 110b may collect historical data where non-learning parts (e.g., rule-based and logic based) were developed. For example, features such as the characteristics of the system can be defined, as well as features for the complexity of the rules, based, for example, on software static analysis. The target for learning would be the human time and effort invested, where this is available for the past examples. The results may then be used to better estimate the likelihood of success involved in the system development. For example, if the rules require a high level of domain expertise and several months of a subject matter expert's time, that might not be available and may introduce a low likelihood of success.

Continuing the previous example, the user developing the ML model for the success assessment program 110a, 110b utilizes three different SMEs to determine the level of effort based on the amount of time for coding the rules to develop the ML models for the 150 adverse events that satisfied the threshold. Based on the SMEs, the estimated coding time ranges from 38 hours to 59 hours. The user determines that the level of effort is moderate.

Then, at 214, the results are presented. The success assessment program 110a, 110b may present to the user the computed feasibility score, effort estimation (i.e., computed level of effort), and the system decomposition associated with the compared level of effort. In at least one embodiment, the results (e.g., data results) may be presented in a table and/or a list. In another embodiment, the results may be presented with a hyperlink that may connect the results to the source(s) of the results. In one embodiment, the success assessment program 110a, 110b may implement color coding or shading to identify whether the computed feasibility score satisfies the threshold. For example, the success assessment program 110a, 110b highlights the computed feasibility score that satisfies the threshold in green, and the computed feasibility score that fails to satisfy the threshold in red.

Continuing the previous example, the success assessment program 110a, 110b presents the table with the computed feasibility score, effort estimation, and the system decomposition associated with the compared level of effort for each of the 800 adverse events in the 600 patients. For each of the adverse events in which the computed feasibility score fails to satisfy the threshold level, the success assessment program 110a, 110b shades the computed feasibility score in a light grey, and the computed feasibility score that satisfies the threshold level remains the same with no shading.

The functionality of a computer may be improved by the success assessment program 110a, 110b because the success assessment program 110a, 110b may assess the likelihood of success involved in developing a machine learning (ML) solution prior to development. In addition, the success assessment program 110a, 110b may assess whether the raw training data fits the problem presented, and may associate a value to how well (or effectively) the raw training data fits the problem presented. Furthermore, the success assessment program 110a, 110b may improve the functionality of a computer regardless of whether data has been labeled, as the success assessment program 110a, 110b considers a decomposition where some of the areas may fit for a successful ML solution.

The success assessment program 110a, 110b may determine the chances, by utilizing a feasibility score and level of effort, of developing a successful ML solution prior to the implementation of the ML solution.

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
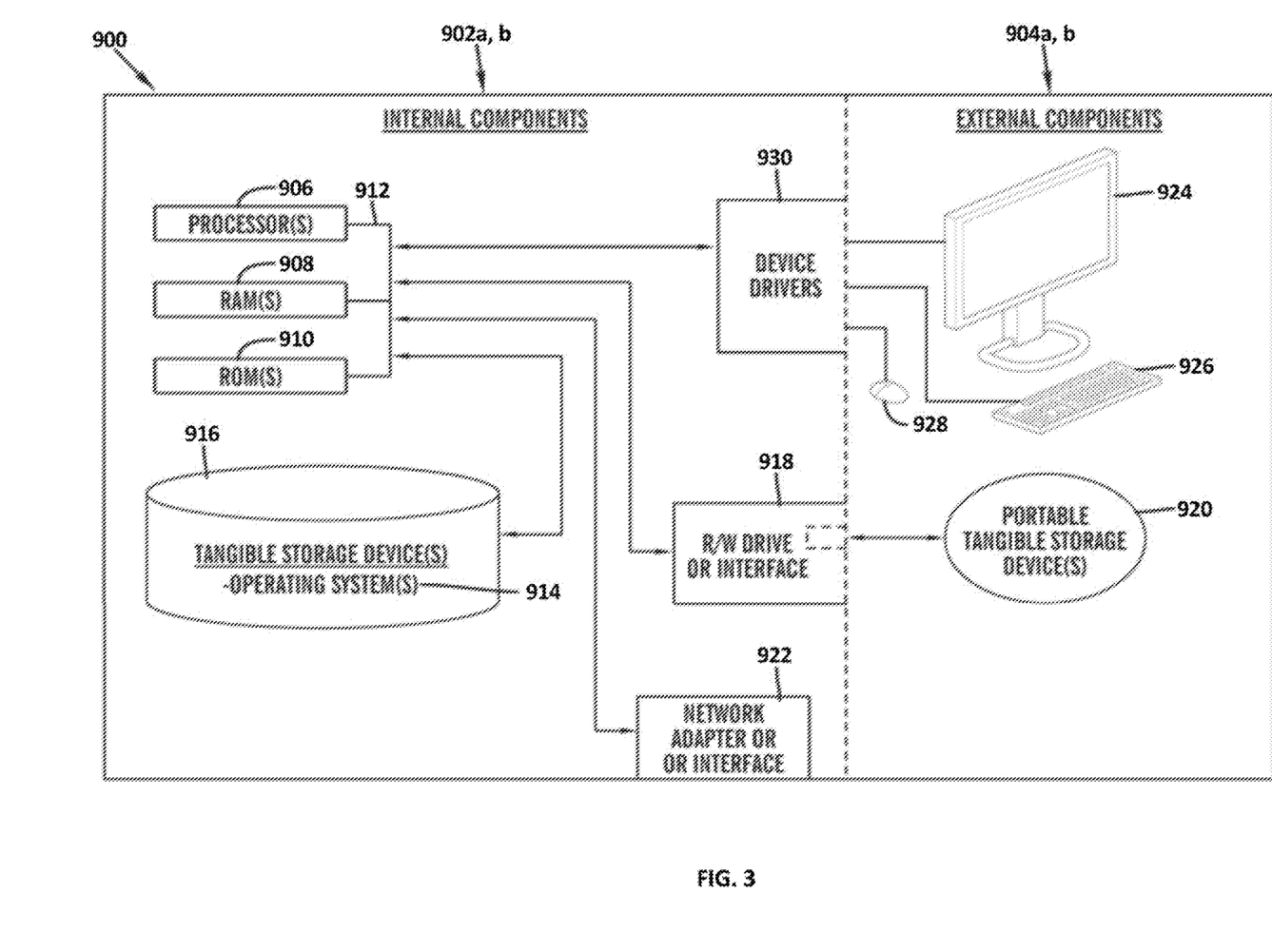
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the success assessment program 110a in client computer 102, and the success assessment program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the success assessment program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the success assessment program 110a in client computer 102 and the success assessment program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the success assessment program 110a in client computer 102 and the success assessment program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
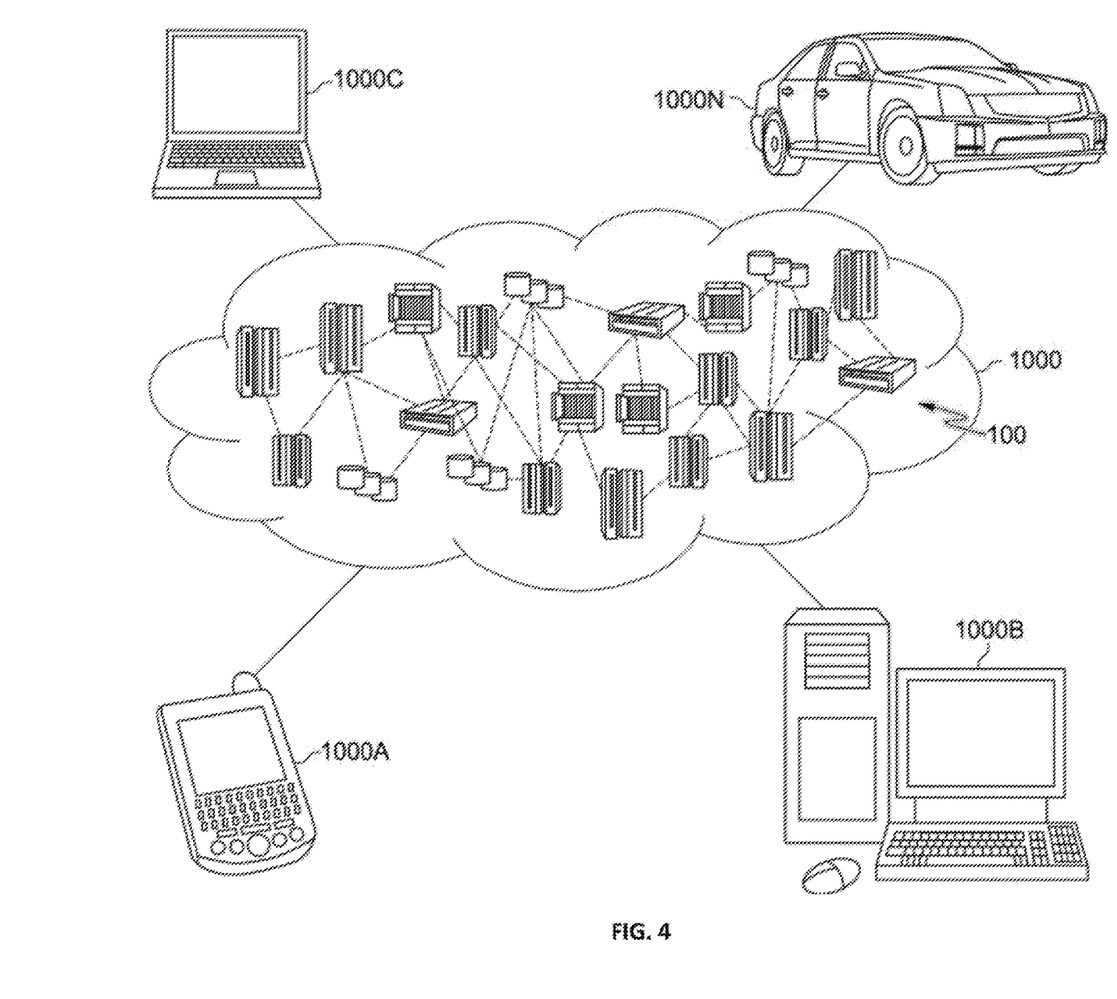
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
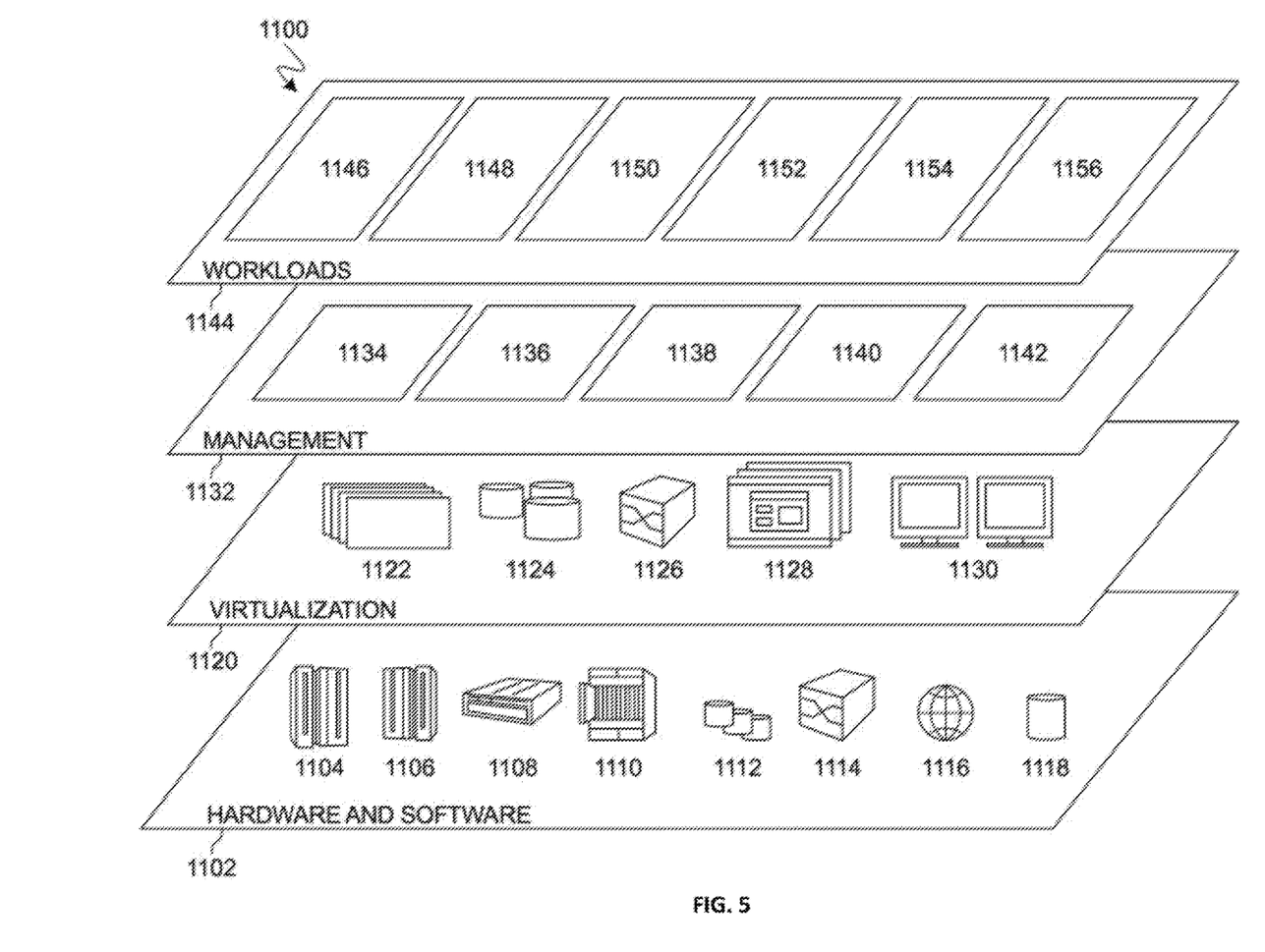
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and success assessment associated with developing a ML solution 1156. A success assessment program 110a, 110b provides a way to develop at least one ML solution by estimating a feasibility score and a level of effort.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for assessing a likelihood of success associated with developing at least one machine learning (ML) solution comprising:
   identifying, by a classifier, a plurality of adverse events within a set of raw training data,
   generating a set of questions based on the set of raw training data, the set of questions relating to a plurality of shortfalls associated with the set of raw training data;
   computing a feasibility score based on the plurality of adverse events and an answer corresponding with each question from the generated set of questions;
   training a machine learning model based on the answer corresponding with each question from the generated set of questions, in which the answer includes at least one set of the raw training data pertaining to the corresponding question;
   in response to determining that the computed feasibility score satisfies a threshold, computing a level of effort associated with developing at least one machine learning (ML) solution to address a problem associated with the plurality of adverse events;
   wherein computing the level of effort associated with developing the at least one ML solution to address the problem associated with the plurality of adverse events further comprises:
   decomposing the problem associated with the at least one ML solution based on a plurality of rule-based parts, wherein the plurality of rule-based parts determine whether the at least one ML solution resolves the decomposed problem;
   classifying the at least one ML solution, wherein one or more labels for classifying the at least one ML solution includes successful or unsuccessful;
   and presenting, to a user, a plurality of results associated with assessing a likelihood of success of the at least one ML solution.

2. The method of claim 1, wherein generating the set of questions based on the set of raw training data, further comprises:
   receiving the set of raw training data;
   identifying one or more best practices from the received set of raw training data, and one or more shortfalls from the received set of raw training data;
   extracting the generated set of questions from the identified one or more best practices and the identified one or more shortfalls; and
   aggregating the generated set of questions with a phase of developing the at least one ML solution.

3. The method of claim 1, further comprising:
   retrieving the answer corresponding with each question from the generated set of questions,
   wherein the retrieved answer corresponding with each question from the generated set of questions is binary.

4. The method of claim 3, further comprising:
   assigning a numeric value to each retrieved answer corresponding with each question; and
   computing the feasibility score based on a sum of assigned numeric value to the retrieved answers to the generated set of questions.

5. The method of claim 1, further comprising:
   in response to determining that the computed feasibility score fails to satisfy the threshold, prompting the user; and
   identifying at least one recommendation to analyze a plurality of factors associated with the computed feasibility score, wherein the identified at least one recommendation is selected from a group consisting of searching for at least one additional set of raw training data, redefining one or more learning goals, and examining each question from the generated set of questions with a retrieved answer that is negative.

6. The method of claim 1, wherein the presented plurality of results includes the computed feasibility score, the computed level of effort, and a decomposition associated with the computed level of effort.

7. A computer system for assessing a likelihood of success associated with developing at least one machine learning (ML) solution, comprising:
one or more processors, one or more computer-readable memories, one or more computer-readable tangible storage medium,
and program instructions stored on at least one of the one or more tangible storage medium for execution by at least one of the one or more processors via at least one of the one or more memories further comprise program instructions to cause the computer system to perform a method comprising:
identifying, by a classifier, a plurality of adverse events within a set of raw training data,
generating a set of questions based on the set of raw training data, the set of questions relating to a plurality of shortfalls associated with the set of raw training data;
computing a feasibility score based on the plurality of adverse events and an answer corresponding with each question from the generated set of questions;
training a machine learning model based on the answer corresponding with each question from the generated set of questions, in which the answer includes at least one set of the raw training data pertaining to the corresponding question;
in response to determining that the computed feasibility score satisfies a threshold, computing a level of effort associated with developing at least one machine learning (ML) solution to address a problem associated with the plurality of adverse events;
wherein computing the level of effort associated with developing the at least one ML solution to address the problem associated with the plurality of adverse events further comprises:
decomposing the problem associated with the at least one ML solution based on a plurality of rule-based parts, wherein the plurality of rule-based parts determine whether the at least one ML solution resolves the decomposed problem;
classifying the at least one ML solution, wherein one or more labels for classifying the at least one ML solution includes successful or unsuccessful;
and presenting, to a user, a plurality of results associated with assessing a likelihood of success of the at least one ML solution.

8. The computer system of claim 7, wherein generating the set of questions based on the set of raw training data, further comprises:
receiving the set of raw training data;
identifying one or more best practices from the received set of raw training data, and one or more shortfalls from the received set of raw training data;
extracting the generated set of questions from the identified one or more best practices and the identified one or more shortfalls; and
aggregating the generated set of questions with a phase of developing the at least one ML solution.

9. The computer system of claim 7, further comprising:
retrieving the answer corresponding with each question from the generated set of questions,
wherein the retrieved answer corresponding with each question from the generated set of questions is binary.

10. The computer system of claim 9, further comprising:
assigning a numeric value to each retrieved answer corresponding with each question; and
computing the feasibility score based on a sum of assigned numeric value to the retrieved answers to the generated set of questions.

11. The computer system of claim 7, further comprising:
in response to determining that the computed feasibility score fails to satisfy the threshold, prompting the user; and
identifying at least one recommendation to analyze a plurality of factors associated with the computed feasibility score, wherein the identified at least one recommendation is selected from a group consisting of searching for at least one additional set of raw training data, redefining one or more learning goals, and examining each question from the generated set of questions with a retrieved answer that is negative.

12. The computer system of claim 7, wherein the presented plurality of results includes the computed feasibility score, the computed level of effort, and a decomposition associated with the computed level of effort.

13. A computer program product for assessing a likelihood of success associated with developing at least one machine learning (ML) solution, the computer program product comprising a computer readable storage medium having program instructions embodied therewith, the program instructions executable by processor to cause the computer to perform the method comprising:
identifying, by a classifier, a plurality of adverse events within a set of raw training data,
generating a set of questions based on the set of raw training data, the set of questions relating to a plurality of shortfalls associated with the set of raw training data;
computing a feasibility score based on the plurality of adverse events and an answer corresponding with each question from the generated set of questions;
training a machine learning model based on the answer corresponding with each question from the generated set of questions, in which the answer includes at least one set of the raw training data pertaining to the corresponding question;
in response to determining that the computed feasibility score satisfies a threshold, computing a level of effort associated with developing at least one machine learning (ML) solution to address a problem associated with the plurality of adverse events;
wherein computing the level of effort associated with developing the at least one ML solution to address the problem associated with the plurality of adverse events further comprises:
decomposing the problem associated with the at least one ML solution based on a plurality of rule-based parts, wherein the plurality of rule-based parts determine whether the at least one ML solution resolves the decomposed problem;
classifying the at least one ML solution, wherein one or more labels for classifying the at least one ML solution includes successful or unsuccessful;

and presenting, to a user, a plurality of results associated with assessing a likelihood of success of the at least one ML solution.

14. The computer program product of claim 13, wherein generating the set of questions based on the set of raw training data, further comprises:
    receiving the set of raw training data;
    identifying one or more best practices from the received set of raw training data, and one or more shortfalls from the received set of raw training data;
    extracting the generated set of questions from the identified one or more best practices and the identified one or more shortfalls; and
    aggregating the generated set of questions with a phase of developing the at least one ML solution.

15. The computer program product of claim 13, further comprising:
    retrieving the answer corresponding with each question from the generated set of questions,
        wherein the retrieved answer corresponding with each question from the generated set of questions is binary.

16. The computer program product of claim 15, further comprising:
    assigning a numeric value to each retrieved answer corresponding with each question; and
    computing the feasibility score based on a sum of assigned numeric value to the retrieved answers to the generated set of questions.

17. The computer program product of claim 13, further comprising:
    in response to determining that the computed feasibility score fails to satisfy the threshold, prompting the user; and
    identifying at least one recommendation to analyze a plurality of factors associated with the computed feasibility score,
    wherein the identified at least one recommendation is selected from a group consisting of searching for at least one additional set of raw training data, redefining one or more learning goals, and examining each question from the generated set of questions with a retrieved answer that is negative.

* * * * *